June 10, 1924.
H. C. ROBERTSON
WINDSHIELD CLEANER
Filed Feb. 9, 1922
1,497,406
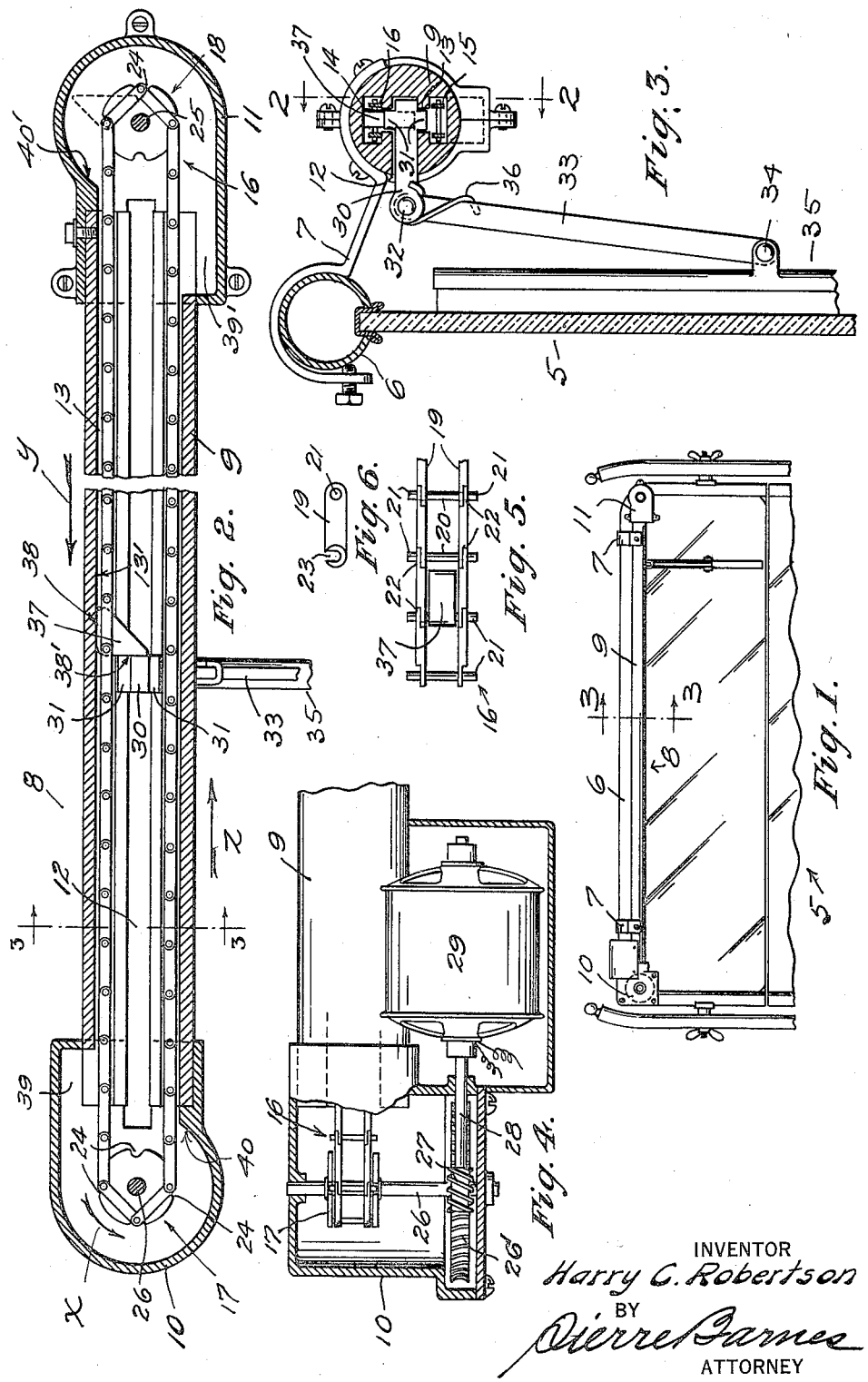
INVENTOR
*Harry C. Robertson*
BY
*Pierre Barnes*
ATTORNEY Patented June 10, 1924.

1,497,406

UNITED STATES PATENT OFFICE.

HARRY C. ROBERTSON, OF SEATTLE, WASHINGTON.

WINDSHIELD CLEANER.

Application filed February 9, 1922. Serial No. 535,277.

*To all whom it may concern:*

Be it known that I, HARRY C. ROBERTSON, a citizen of the United States, residing at Seattle, in the county of King and State of Washington, have invented certain new and useful Improvements in Windshield Cleaners, of which the following is a specification.

This invention relates to window cleaners and more especially to power actuated means whereby such cleaners are operated.

The principal object of my invention is the provision of devices of this character which will be of inexpensive and durable construction easy to apply and efficient in operation.

Other objects and advantages of the invention will appear from the following specification.

The invention consists of a window cleaning member which is afforded reciprocatory movements by means of a reversible carrier provided upon an endless belt or chain which is driven in one revoluble direction.

The invention further consists in the means for effecting the reversal of the carrier above mentioned and to certain other novel features of construction and combination of parts hereinafter described and claimed.

In the accompanying drawings,—

Figure 1 is a front elevational view of an automobile windshield with apparatus embodying my invention applied thereto. Fig. 2 is a longitudinal section taken substantially through 2—2 of Fig. 3 of the swipe operating mechanism. Fig. 3 is a transverse sectional view through 3—3 of Figs. 1 and 2. Fig. 4 is a view partly in plan and partly in horizontal section of a portion of the apparatus to illustrate the preferred means for driving the swipe operating mechanism. Fig. 5 is a fragmentary plan view of the conveyor chain, and Fig. 6 is a side elevational view of a detachable link of such chain.

In said drawings, the reference numeral 5 designates the windshield of a motor vehicle and 6 is the top bar of the windshield frame.

Connected to said frame bar by hangers 7 or by any other suitable means is a casing indicated by 8. Said casing, as shown, consists of a horizontally disposed tubular central section 9 rigid with two end sections 10 and 11. Said central section is provided at the side adjacent to the windshield with a longitudinal slot 12 which communicates with a guide way 13 of substantially oblong form in transverse section and disposed in rectangular relations with respect to the slot 12. The guide way 13 adjacent its upper and lower edges communicates with recesses 14 and 15 to accommodate horizontal leads of an endless chain 16, which passes about sprocket wheels 17 and 18 provided in the chambers of the respective end sections 10 and 11 of the casing.

As illustrated in Figs. 5 and 6, each of the chain links comprises complementary longitudinal bar elements 19 rigidly connected to a transverse bar element 20 whose ends afford studs 21 which protrude from the outer sides of the respective longitudinal elements. The bar elements of the respective chain links are desirably formed with interfitting extremities, such as 22, and the ends of the links which engage the studs 21 of the adjacent links are desirably slotted, as at 23 Fig. 6, to afford a separable hook engagement with such studs. Each of the sprocket wheels 17 and 18 consists of two disks, which as illustrated in Fig. 4 with respect to the wheel 17, are spaced apart to permit the link bars 19 to pass there between, the studs progressively engaging in peripheral notches 24 provided in the respective wheel disks. The wheel 18 is mounted on an idler shaft 25 journaled in the front and rear walls of the casing section 11. The wheel 17 is mounted on a shaft 26 which is journaled in the front and rear walls of the casing section 10. The shaft 26 is driven in the rotary direction indicated by arrow X, Fig. 2, by any suitable means as, for example, through the medium of a worm wheel 26' on the shaft from a worm 27 provided on the armature shaft 28 of an electric motor 29.

30 represents a carriage supported upon the bottom of the slot 12 and is provided interiorly of the casing with upwardly and downwardly projecting portions 31 which extend into the guide way 13 above and below said slot.

The end of the carriage outside of the casing is pivotally connected by means of a pin 32 to a depending rod 33 whose lower end is, in turn, pivotally connected by means of a pin 34 to a glass-cleaning swipe 35 which may be of any suitable or well known construction.

36 represents a spring which serves to yieldingly retain the swipe 35 in operative relations with the windshield glass. In operation, the swipe is reciprocated horizontally with the carriage 30 through the instrumentality of a block attachment 37 of the chain 16. The block 37 is of a substantially triangular shape in longitudinally vertical section with two of its sides, 38 and 38', disposed in right angular relations with each other and, in the angle between such sides, the block is provided with a transversely arranged aperture to receive one of the bar elements 20 of said chain and whereby the block is connected thereto for oscillatory movements.

The block when travelling with the chain in the direction indicated by arrow Y in Fig. 2 is held by the block side 38 bearing against the top wall 13' of said guide way to cause the block to push the swipe conveying carriage in the direction indicated by arrow Y until the carriage approaches to within a short distance of the left hand end of the casing slot.

At such a position a cavity 39 provided at a higher elevation than the guide way 13 permits the block to swing upwardly and pass over the carriage.

The block is thereupon carried with the chain 16 about the sprocket wheel 17 and thence in the direction of arrow Z until the block encounters a shoulder 40 whereby the block is swung upwardly into the guide way 13.

In the continued travel of the block, the carriage is engaged thereby and thus conveyed into proximity of the other end of the casing slot, whereupon the block passes beneath the carriage through cavity 39' in the casing part 16 and returning, the block is influenced by the shoulder 40' to engage the carriage and push it from its position of rest in the direction of arrow Y. By the above described devices it will be apparent that the carriage which conveys the swipe is reciprocated by the chain in each cycle of the latter's revolution.

What I claim, is—,

1. In apparatus for cleaning windshields, a member mounted to reciprocate, an endless chain, means to progressively drive said chain in a single revoluble direction, an attachment pivotally connected to said chain and means whereby said attachment is oscillated to cause the same to engage said member at its opposite ends for reciprocating the latter in the successive revoluble movements of the chain.

2. In apparatus for cleaning windshields, a casing comprising rigidly connected end sections and a tubular central section provided with a longitudinal slot, a carriage mounted for travel in said central section, said carriage having a part thereof extending through the casing slot and adapted to carry a cleaning element, a sprocket wheel mounted for rotation in each of said end sections, a chain extending through the central section of the casing and passing about the sprocket wheels in the respective end sections, means to drive the chain in a single revoluble direction, an attachment of a substantially triangular shape pivotally connected adjacent one of its corners to a link of said chain, means for controlling said attachment in its passage through said central section of the casing whereby the carriage is conveyed longitudinally of the casing, and means provided in the end sections of the casing whereby said attachment is influenced to afford reciprocatory travel to the carriage.

3. In apparatus for cleaning windshields, a casing adapted for attachment to a windshield, said casing being provided with a longitudinal slot, a carriage provided in the casing and having a part extending through said slot and adapted to carry a cleaning element, sprocket wheels provided within the casing and respectively positioned adjacent to the ends thereof, an endless chain passing about said sprocket wheels, means for driving the chain, an invertible attachment carried by said chain, and means located adjacent to the ends of said casing whereby said attachment is inverted at each end of the casing for engaging the carriage at opposite ends alternately to effect reciprocatory movements of the carriage in the revoluble travel of the chain.

4. In apparatus for cleaning windshields, a casing adapted for attachment to a windshield, said casing being provided with a longitudinal slot, a carriage extending through said slot and adapted to carry a cleaning element exteriorly of the casing, sprocket wheels provided within the casing and respectively positioned adjacent to the ends thereof, an endless chain passing about said sprocket wheels, means operatively connected with one of said wheels for driving the chain, an attachment to said chain, and means located adjacent to the ends of said casing whereby said attachment is rendered operative to engage the opposite ends of the carriage alternately to effect reciprocatory movements of the carriage in the revoluble travel of the chain.

Signed at Seattle, Washington, this 27th day of January 1922.

HARRY C. ROBERTSON.

Witnesses:
PIERRE BARNES,
A. B. CORNELIUS.